(12) United States Patent
Cote et al.

(10) Patent No.: US 7,646,305 B2
(45) Date of Patent: Jan. 12, 2010

(54) CAPACITOR STRAP

(75) Inventors: Andre Cote, Williamstown, NJ (US); Luis Francisco Soler Bonnin, Guanica, PR (US)

(73) Assignee: Checkpoint Systems, Inc., Thorofare, NJ (US)

( * ) Notice: Subject to any disclaimer, the term of this patent is extended or adjusted under 35 U.S.C. 154(b) by 293 days.

(21) Appl. No.: 11/539,995

(22) Filed: Oct. 10, 2006

(65) Prior Publication Data

US 2007/0090955 A1    Apr. 26, 2007

Related U.S. Application Data

(60) Provisional application No. 60/730,053, filed on Oct. 25, 2005.

(51) Int. Cl.
*G08B 13/14* (2006.01)
(52) U.S. Cl. .................. 340/572.7; 361/761
(58) Field of Classification Search .......... 340/572.7, 340/572.1, 572.8; 334/45; 343/749; 361/301.1, 361/760–763
See application file for complete search history.

(56) References Cited

U.S. PATENT DOCUMENTS

| 4,567,473 A | 1/1986 | Lichtblau |
|---|---|---|
| 4,658,264 A | 4/1987 | Baker |
| 4,835,524 A | 5/1989 | Lamond et al. |
| 5,108,822 A | 4/1992 | Imaichi et al. |
| 5,172,461 A | 12/1992 | Pichl |
| 5,528,222 A | 6/1996 | Moskowitz et al. |
| 5,541,399 A * | 7/1996 | de Vall .................. 343/895 |
| 5,576,925 A | 11/1996 | Gorowitz et al. |
| 5,781,110 A | 7/1998 | Habeger, Jr. et al. |
| 5,786,626 A | 7/1998 | Brady et al. |
| 5,861,809 A | 1/1999 | Eckstein et al. |
| 5,973,908 A | 10/1999 | Saia et al. |
| 6,025,780 A | 2/2000 | Bowers et al. |
| 6,071,597 A | 6/2000 | Yang et al. |
| 6,100,804 A | 8/2000 | Brady et al. |
| 6,181,287 B1 | 1/2001 | Beigel |
| 6,212,057 B1 | 4/2001 | Kohara et al. |
| 6,232,878 B1 | 5/2001 | Rubin |

(Continued)

FOREIGN PATENT DOCUMENTS

EP    0704816    4/1996

(Continued)

OTHER PUBLICATIONS

International Search Report, PCT/US2006/060154, dated Oct. 22, 2007.

*Primary Examiner*—John A Tweel, Jr.
(74) *Attorney, Agent, or Firm*—Caesar, Rivise, Bernstein, Cohen & Pokotilow, Ltd.

(57) ABSTRACT

A capacitor strap that is applied to a security tag coil or antenna to form and properly tune an EAS or an RFID security tag. The capacitor strap is a thin film capacitor formed of two metal foils in between which is a dielectric material having ends that are electrically coupled to different points of a security tag coil or antenna. The capacitor strap may include an RFID integrated circuit, either in series or in parallel with the capacitor, which is then applied to security tag coil at a particular location to tune the tag to a predetermined frequency.

28 Claims, 10 Drawing Sheets

U.S. PATENT DOCUMENTS

| | | |
|---|---|---|
| 6,459,588 B1 * | 10/2002 | Morizumi et al. ........... 361/761 |
| 6,594,134 B2 | 7/2003 | Yializis |
| 6,665,193 B1 | 12/2003 | Chung et al. |
| 6,678,927 B1 | 1/2004 | Retseptor |
| 6,728,092 B2 | 4/2004 | Hunt et al. |
| 6,927,085 B2 | 8/2005 | Hadley et al. |
| 6,940,408 B2 | 9/2005 | Ferguson et al. |
| 6,951,596 B2 | 10/2005 | Green et al. |
| 2003/0214792 A1 * | 11/2003 | Credelle et al. ............. 361/760 |
| 2004/0125040 A1 | 7/2004 | Ferguson et al. |

FOREIGN PATENT DOCUMENTS

| | | |
|---|---|---|
| EP | 1014302 | 6/2000 |
| WO | WO02/097724 | 12/2002 |

* cited by examiner

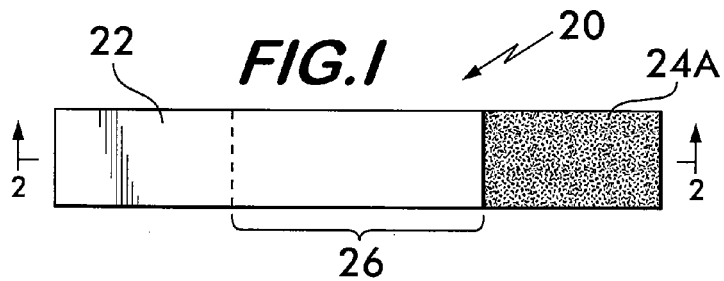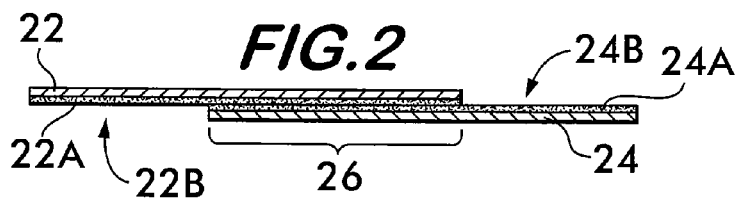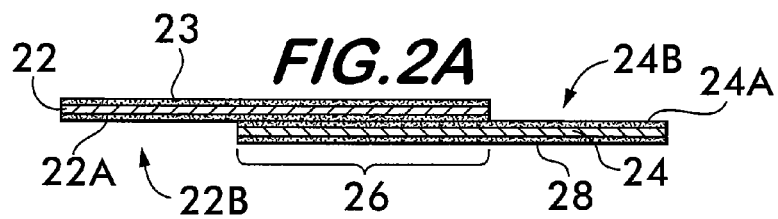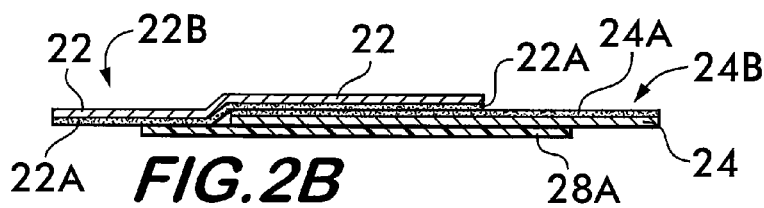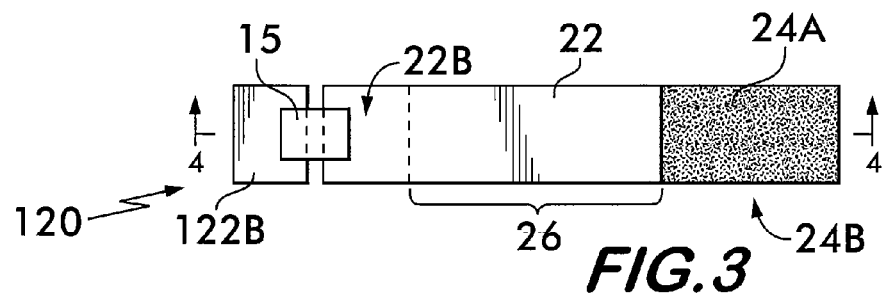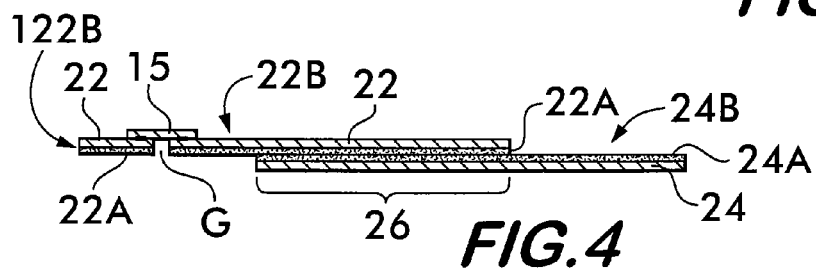

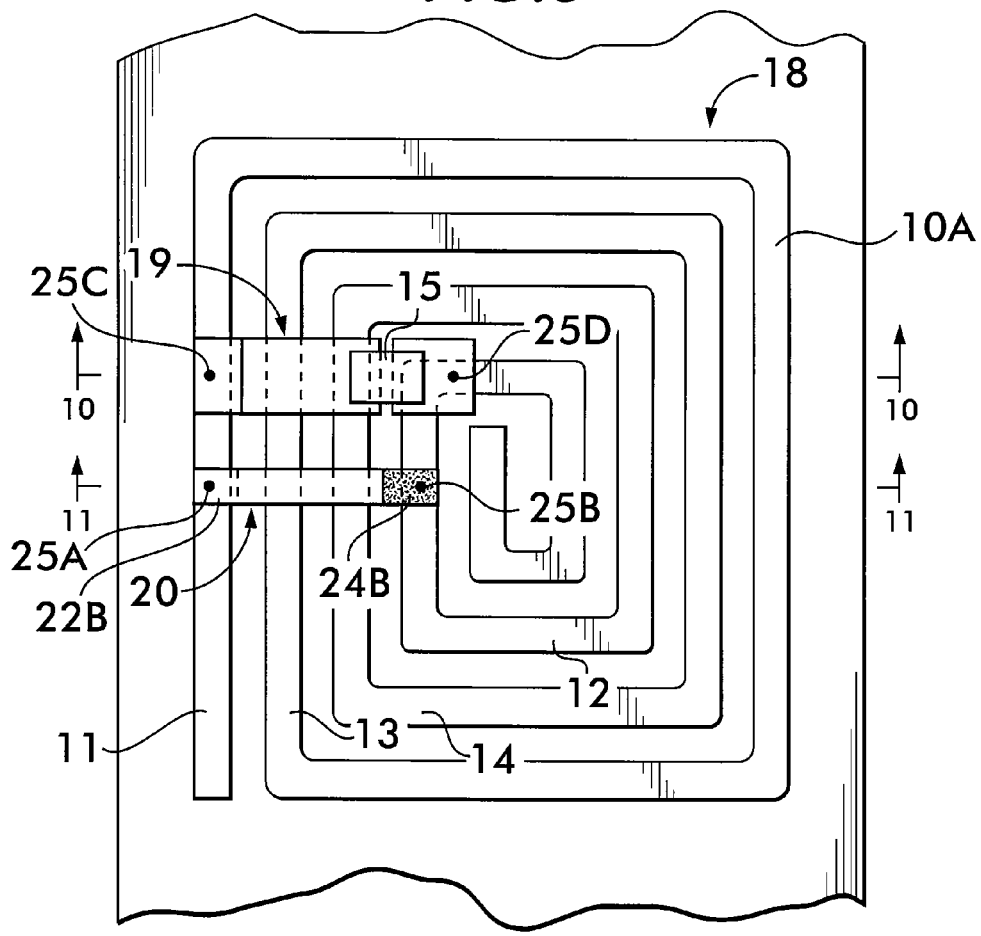
FIG.9
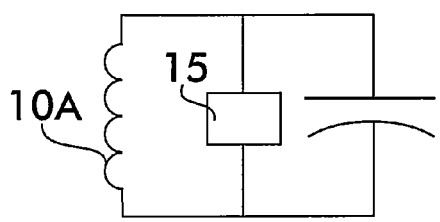
FIG.9A
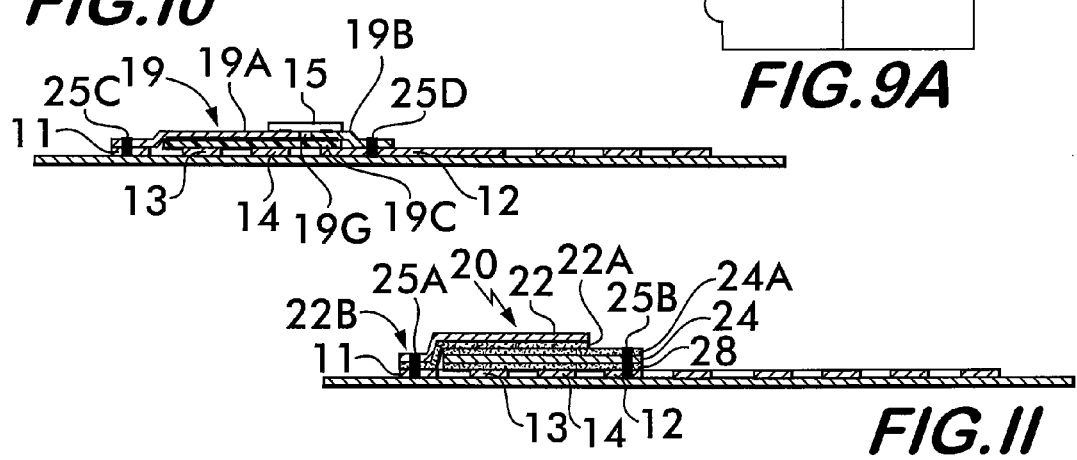
FIG.10
FIG.11

CAPACITOR STRAP

CROSS-REFERENCE TO RELATED APPLICATIONS

This utility application claims the benefit under 35 U.S.C. §119(e) of Provisional Application Ser. No. 60/730,053 filed on Oct. 25, 2005 entitled CAPACITOR STRAP and whose entire disclosure is incorporated by reference herein.

BACKGROUND OF THE INVENTION

1. Field of Invention

The current invention relates to security tags and more particularly, discloses a capacitor strap that can be applied to an EAS or RFID coil or antenna to complete the EAS or RFID tag.

2. Description of Related Art

Electronic article surveillance (EAS) security tags, typically comprise a resonant circuit that utilize at least one coil and at least one capacitor that operate to resonate when exposed to a predetermined electromagnetic field (e.g., 8.2 MHz) to which the EAS tag is exposed. By way of example only, the coil and the capacitor are etched on a substrate whereby a multi-turn conductive trace (thereby forming the coil) terminates in a conductive trace pad which forms one plate of the capacitor. On the opposite side of the substrate another conductive trace pad is etched to form the second capacitor plate, while an electrical connection is made through the substrate from this second plate to the other end of the coil on the first side of the substrate; the non-conductive substrate then acts as a dielectric between the two conductive trace pads to form the capacitor. Thus, a resonant circuit is formed. Various different resonant tag products are commercially available and described in issued patents, for example, U.S. Pat. Nos. 5,172,461; 5,108,822; 4,835,524; 4,658,264; and 4,567,473 all describe and disclose electrical surveillance tag structures. However, such products utilize, and indeed require, substrates which use patterned sides of conductive material on both face surfaces of the substrate for proper operation. Special conductive structures and manufacturing techniques must be utilized on both substrate faces for producing such resonant tag products. Currently available EAS tag structures have numerous drawbacks. For example, since special patterning and etching techniques must be utilized on both sides of the available tags to produce the proper circuit, per unit processing time and costs are increased. Furthermore, the complexity of the manufacturing machinery required for production is also increased. Oftentimes, complex photo-etching processes are used to form the circuit structures. As may be appreciated, two sided photo-etching is generally time consuming and requires precise alignment of the patterns on both sides. Additional material is also necessary to pattern both sides, thus increasing the per unit material costs.

With particular regard to radio frequency identification (RFID) tags, RFID tags include an integrated circuit (IC) coupled to a resonant circuit as mentioned previously or coupled to an antenna (e.g., a dipole) which emits an information signal in response to a predetermined electromagnetic field (e.g., 13.56 MHz). Recently, the attachment of the IC has been accomplished by electrically-coupling conductive flanges to respective IC contacts to form a "chip strap." This chip strap is then electrically coupled to the resonant circuit or antenna. See for example U.S. Pat. No. 6,940,408 (Ferguson, et al.); U.S. Pat. No. 6,665,193 (Chung, et al.); U.S. Pat. No. 6,181,287 (Beigel); and U.S. Pat. No. 6,100,804 (Brady, et al.).

However, it has been determined that the formation of the capacitive element of the EAS circuit or of the RFID circuit is what substantively controls the tuning of the EAS resonant circuit, or the RFID circuit, to respond properly to the desired electromagnetic field. Thus, there remains a need for an EAS or RFID tag that can be efficiently formed and tuned properly, as well as a method for efficiently and accurately forming, as well as controlling the tuning of, an EAS tag or an RFID tag.

All references cited herein are incorporated herein by reference in their entireties.

BRIEF SUMMARY OF THE INVENTION

A strap component for electrically bridging at least two respective portions of an antenna or coil component of an EAS or RFID tag or inlay. The strap component is a thin, generally planar member comprising a first electrically conductive planar element, a second planar electrically conductive element and a planar dielectric layer disposed between at least portions of the first and second electrically conductive planar elements, whereupon the strap component exhibits a desired capacitance. The first electrically conductive element includes a first portion arranged to be secured in electrical continuity with one of the at least two respective portions of the antenna or coil. The second electrically conductive element includes a first portion arranged to be secured in electrical continuity with another of the at least two respective portions of the antenna or coil.

An EAS or RFID tag or inlay comprising an antenna or coil component and a strap component bridging at least two respective portions of the antenna or coil component. The strap component is a thin, generally planar member comprising a first electrically conductive planar element, a second electrically conductive planar element and a planar dielectric layer disposed between at least portions of the first and second electrically conductive planar elements, whereupon the strap component exhibits a desired capacitance. The first electrically conductive element includes a first portion secured in electrical continuity with one of the at least two respective portions of the antenna or coil. The second electrically conductive element includes a first portion secured in electrical continuity with another of the at least two respective portions of the antenna or coil.

A thin, generally planar, flexible, strap component for electrically bridging at least two respective portions of an antenna or coil component of an EAS or RFID tag or inlay. The strap component exhibits a desired capacitance and comprises a first electrically conductive planar element and a second electrically conductive planar element, and a planar dielectric layer disposed between at least portions of the first and second electrically conductive planar elements. The first electrically conductive element includes a first portion arranged to be secured in electrical continuity with one of the at least two respective portions of the antenna or coil. The second electrically conductive element includes a first portion arranged to be secured in electrical continuity with another of the at least two respective portions of the antenna or coil, resulting in the formation of the EAS or RFID tag or inlay.

A method of making an EAS or RFID tag or inlay comprising: (a) providing a thin, generally planar antenna or coil component; (b) providing a thin, generally planar, strap component comprising a first electrically conductive planar element, a second electrically conductive planar element and a planar dielectric layer disposed between at least portions of the first and second electrically conductive elements, and whereupon the strap component exhibits a desired capacitance; and (c) causing the strap component to bridge at least two respective portions of the antenna or coil component, whereupon a first portion of the first electrically conductive element is secured in electrical continuity with one of the at least two respective portions of the antenna or coil and a first portion of the second electrically conductive element is secured in electrical continuity with another of the at least two respective portions of said antenna or coil.

BRIEF DESCRIPTION OF SEVERAL VIEWS OF THE DRAWINGS

The invention will be described in conjunction with the following drawings in which like reference numerals designate like elements and wherein:

FIG. 1 is a plan view of a capacitor strap of the present invention;

FIG. 2 is a cross-sectional view of the capacitor strap taken along line 2-2 of FIG. 1;

FIG. 2A is a cross-sectional view of the capacitor strap taken along line 2-2 of FIG. 1 formed by a hybrid-style process;

FIG. 2B is a cross-sectional view of the capacitor strap taken along line 2-2 of FIG. 1 formed by an etching process and including an insulator layer along the lower conductive layer;

FIG. 3 is a plan view of a second embodiment of the capacitor strap which includes an integrated circuit electrically-coupled to the capacitor strap;

FIG. 4 is a cross-sectional view of the capacitor strap of FIG. 3 taken along line 4-4 of FIG. 3;

FIG. 9 is a plan view of a plan view of a capacitor strap of FIG. 3, and a chip strap applied in parallel to a multi-turn coil;

FIG. 9A is an equivalent circuit schematic of the circuit formed in FIG. 9;

FIG. 10 is a cross-sectional view of the tag of FIG. 9 taken along line 10-10 of FIG. 9;

FIG. 11 is a cross-sectional view of the tag of FIG. 9 taken along line 11-11 of FIG. 9;

DETAILED DESCRIPTION OF THE INVENTION

Figure 5:
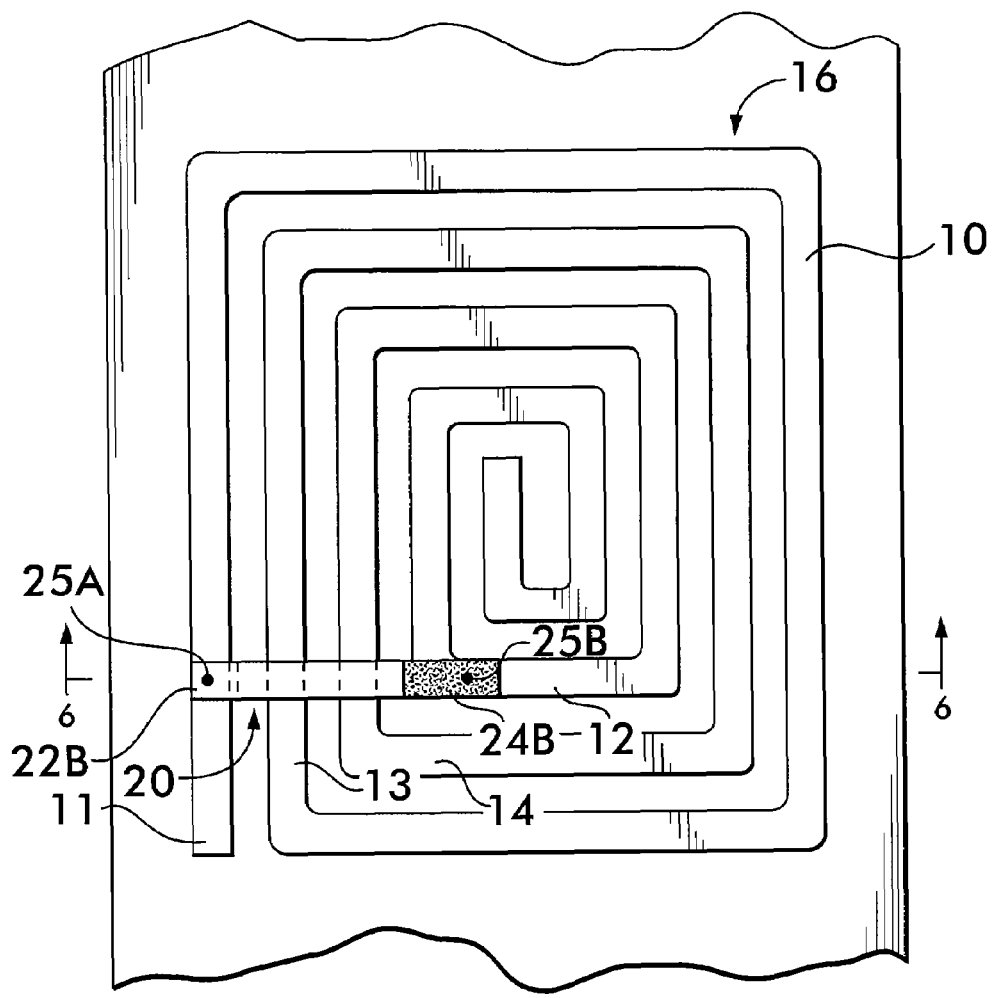
FIG. 5 is a plan view of the capacitor strap of FIG. 1 applied to a multi-turn coil.

FIG. 1 depicts an enlarged plan view of a capacitor strap 20 of the present invention. As can be seen most clearly in FIG. 2, the capacitor strap 20 is a thin film capacitor, and may be flexible, that comprises a first electrically conductive planar element 22 having an associated dielectric layer 22A and a second electrically conductive planar element 24 having an associated dielectric layer 24A and wherein portions of the elements 22 and 24 overlap 26, thereby forming a capacitor. As is known to those skilled in the art, the amount of overlap 26 determines the capacitance.

Although there are many ways of forming the capacitor strap 20, the preferred method is to provide a pair of rolls, each containing a metal foil (e.g., aluminum) that is heat fused to a dielectric material (e.g., a heat seal dielectric material such as polyester or polyethylene which readily bonds to aluminum; however, other dielectric materials, such as a styrene-acylate polymer or a vinyl acetate could also be used; and/or the dielectric layer may form a coating applied to the metal foil). These rolls are oriented such that during formation of the capacitor straps 20, the associated dielectric layers 22A/24A face each other. The associated dielectric layers 22A/24A are then heat fused together. Using a cutting die (not shown) and by precisely controlling the cut of the first electrically conductive planar element 22 and its associated dielectric layer 22A (or vice versa, i.e., cutting the second electrically conductive planar element 24 and its associated dielectric layer 24A), large numbers of capacitor straps 20 can be generated. By also varying the relative lengths of the element 22/associated dielectric layer 22A and the element 24/associated dielectric layer 24A (i.e., varying the overlap 26), capacitor straps 20 of different capacitances can also be generated. Alternatively, the metal foil may be purchased with the dielectric layer already applied (known as a "hybrid-style" (see FIGS. 19-21 and their related discussion below)). Or, the dielectric layer may be applied to the metal foil by printing the dielectric on-line using a gravure knife over roll or a similar printing process (e.g., as part of an etching process, see FIGS. 15-18 and their related discussion below).

Figure 5A:
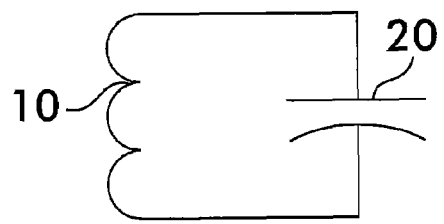
FIG. 5A is an equivalent circuit schematic of the circuit formed in FIG. 5.
Figure 6:
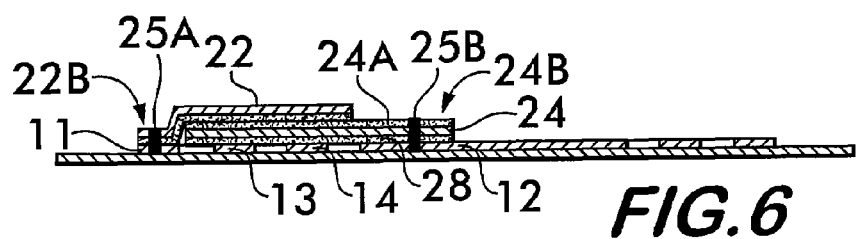
FIG. 6 is a cross-sectional view of the tag of FIG. 5 taken along line 6-6 of FIG. 5.

A capacitor strap 20 is then electrically coupled to an EAS or RFID coil or antenna, by electrically connecting the non-overlapping ends 22B of the first electrically conductive planar element 22 and the non-overlapping end 24B of the second electrically conductive planar element 24 to respective portions of the coil or antenna. Although there are many ways of achieving such an electrical connection 25 (which are indicated by solid black circular dots in the figure), a preferred way is a "cold weld" using high pressure whereby the planar elements 22/24 are electrically coupled to the respective portions of the coil; an alternative way is by "hot welding" the planar elements to the respective portions of the coil; this involves heating the conductive portions and then crimping them such there is metal-to-metal contact of the planar element 22 (or 24) to the respective coil portion, thereby forming the electrical connection. Where the coil or antenna comprises several turns, for example as shown by the coil 10 in FIG. 5, in order to prevent shorting of the second electrically conductive planar element 24, an insulator layer 28 (FIG. 2A, e.g., a dielectric material), or paper insulator layer 28A (FIG. 2B), is applied to the element 24, or is otherwise interposed between the second electrically conductive planer layer 28 and the coil/antenna. As can be most clearly seen in FIG. 6, the insulator layer 28 isolates the element 24 from turn tracks 13 and 14, while electrical connection of the capacitor strap 20 is made at connections 25A and 25B at ends 22B and 24B of the capacitor strap 20 to coil tracks 11 and 12, respectively. It should be noted that where a coil of less than one turn is provided, the insulator layer 28 is not required since the capacitor strap 20 does not crossover any other coil tracks. Thus, an EAS tag or inlay 16 is created having an equivalent circuit formed by the coil 10 and the capacitor strap 20, as shown in FIG. 5A.

It should be noted that the coil 10 is formed as part of a conductive layer that is on or in a substrate which is not shown.

As mentioned earlier, FIGS. 2A and 2B provide alternative insulator layer schemes. The preferred method, as discussed with respect to FIGS. 19-21, utilizes combining a pair of double side heat seal coated metal (e.g., aluminum) to form the capacitor straps 20. In particular, as shown in FIG. 2A, a first laminate formed from the first electrically conductive planar element 22 covered on respective sides with insulator layers 23 and 22A is combined with a second laminate formed from the second electrically conductive planar element 24 covered on respective sides with insulator layers 24A and 28; these two double side heat seal coated metal layers are combined at the interface between insulative layers 22A and 24A to form the capacitor strap 20. A less preferred method does not use a double heat seal coated metal (e.g., the process shown in FIGS. 15-18) in which case a separate insulative layer 28A may be applied to the exposed side of the second electrically conductive planar element 24 to prevent electrical shorting when the capacitor strap 20 is applied to the coil/antenna where the exposed side of the element 24 may cross over coil/antenna conductors.

FIG. 3 depicts a plan view of a capacitor strap 120 which includes an IC that is in series with the capacitor. In particular, the capacitor strap 120 comprises a similar configuration as described previously with the capacitor strap 20. However, in addition, the element 22 of the non-overlapping end 22B is electrically coupled to an electrical contact (not shown) of an IC 15. The other electrical contact (also not shown) of the IC 15 is electrically coupled to a flange 122B that is similar to the construction of the non-overlapping end 22B. As can be seen most clearly in FIG. 4, there is a gap G that separates the element 22 of the non-overlapping end 22B and the flange 122B. This prevents shorting of the IC 15 contacts.

Figure 7:
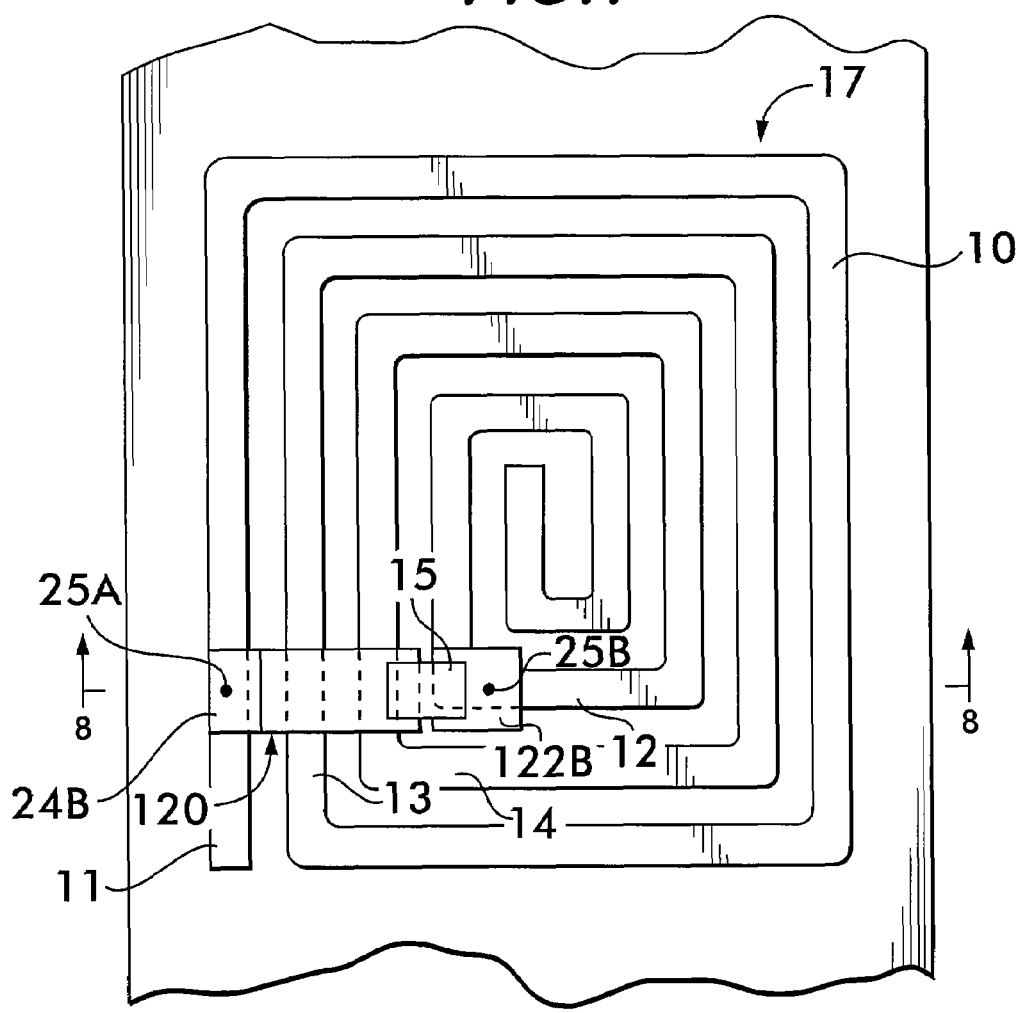
FIG. 7 is a plan view of the capacitor strap of FIG. 3 applied to a multi-turn coil.
Figure 7A:
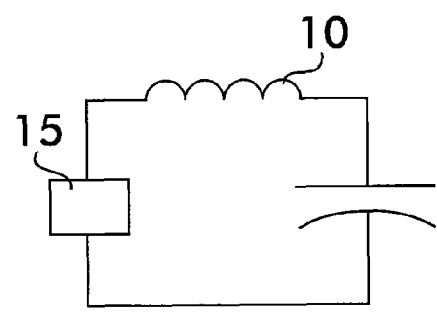
FIG. 7A is an equivalent circuit schematic of the circuit formed in FIG. 7.
Figure 8:
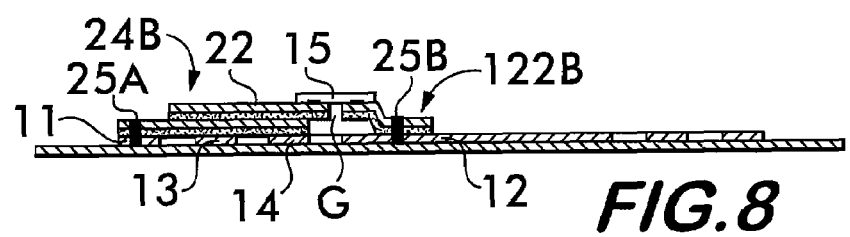
FIG. 8 is a cross-sectional view of the tag of FIG. 7 taken along line 8-8 of FIG. 7.

This capacitor strap 120 can then be applied to a coil 10, as shown in FIG. 7 to form an RFID tag or inlay 17. In particular, by electrically connecting the non-overlapping end 24B of the second electrically conductive planar element 24 and the flange 122B to respective portions of the coil or antenna. As shown in FIGS. 7-8, the non-overlapping edge 24B is electrically connected at 25A to turn track 11 and the flange 122B is electrically coupled at 25B to turn track 12. The insulative layer 28 under the element 24 prevents any shorting to turn tracks 13-14 of the coil 10. An equivalent circuit of the RFID tag 17 is shown in FIG. 7A, showing the series relationship of the IC 15 and the capacitor and the coil 10.

It should be noted that the actual capacitor formed in FIGS. 4 and 7 by the capacitor strap 120 is similar in construction to that in capacitor strap 20. However, it should be noted that the actual capacitor formed has a different capacitance value than the capacitor formed in the capacitor strap 20 because RFID operation is, by way of example only, 13.56 MHz as compared to EAS operation which is approximately 8.2 MHz.

It should be readily apparent from these two examples, that depending on the type of capacitor strap applied to the coil 10, either capacitor strap 20 or capacitor strap 120, an EAS tag or an RFID tag, respectively, is formed.

It should be understood that the capacitor straps 20 and 120 can be manufactured with varying amounts of overlap 26 (for different capacitance values) and with varying lengths of the non-overlapping edges 22B, 24B and flange 122B such that the capacitor straps 20, 120 can be applied over different coil tracks of the coil 10 to change the resonant frequency of the tag 16 and 17. Thus, the relative position of the capacitor straps 20 and 120 shown with respect to the coil 10 are by way of example only.

FIGS. 9-11 depict the use of the capacitor strap 20 and a conventional chip strap 19 being used on a common coil 10A to form an RFID tag 18 using a parallel resonant circuit, as shown in FIG. 9A. The capacitor strap 20 is electrically coupled to the coil in a manner similarly discussed with regard to FIGS. 5-6 previously and will not be discussed again. The chip strap 19 comprises an IC 15 that is electrically connected to conductive flanges 19A and 19B. A gap 19G also separates these two flanges to prevent shorting the IC 15 electrical contacts (not shown). The conductive flanges 19A and 19B are electrically coupled to respective locations of the coil 10A at connections 25C and 25D, respectively. To prevent shorting the IC 15 when it is electrically coupled to the coil 10A, an insulating layer 19C (e.g., paper) is disposed between the conductive flanges 19A/19B and the coil 10A, as shown most clearly in FIG. 10. It should be understood that the chip strap 19 does not comprise a thin film capacitor as does the capacitor strap 20 (or capacitor strap 120).

Figure 12:
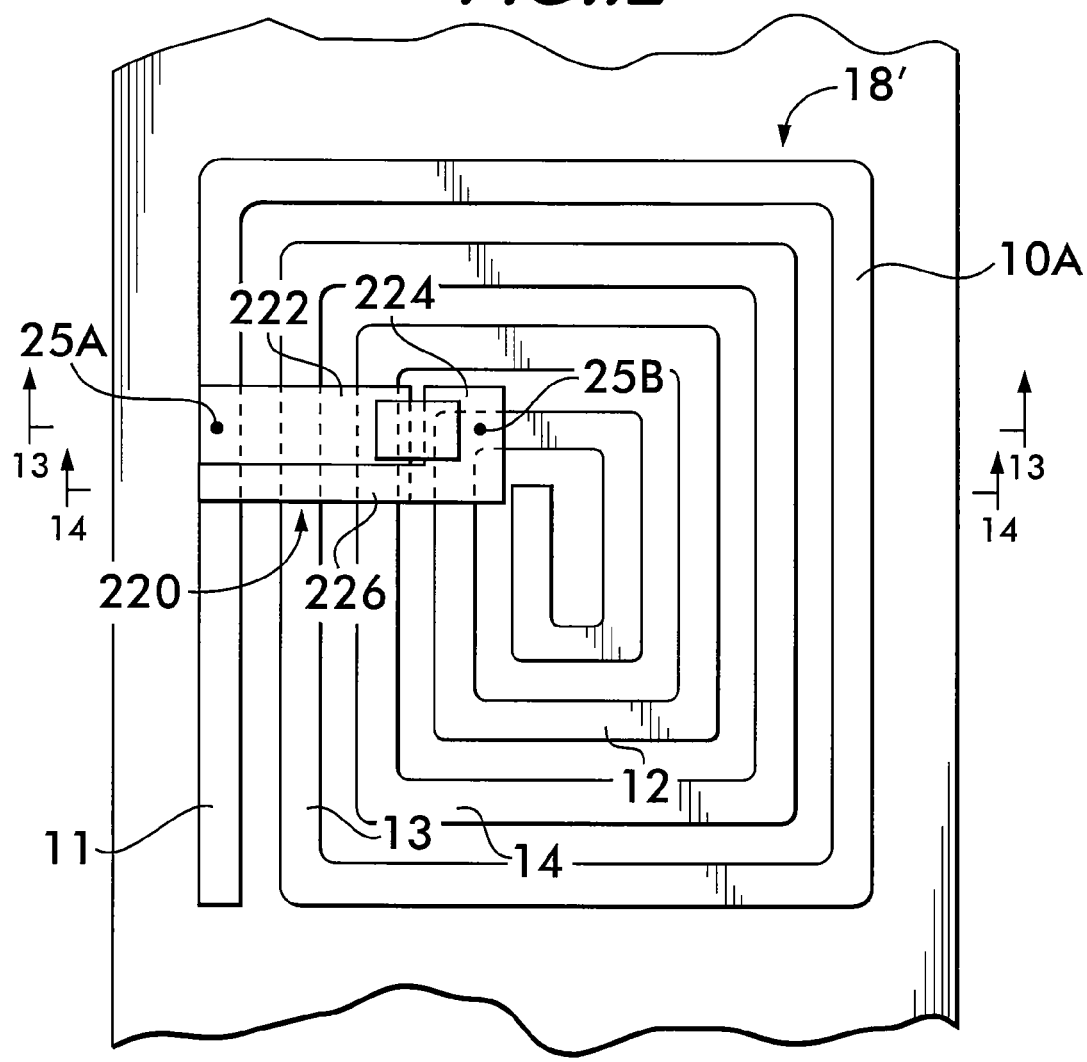
FIG. 12 is a plan view of an integrated parallel chip-capacitor strap applied to a multi-turn coil.
Figure 12A:
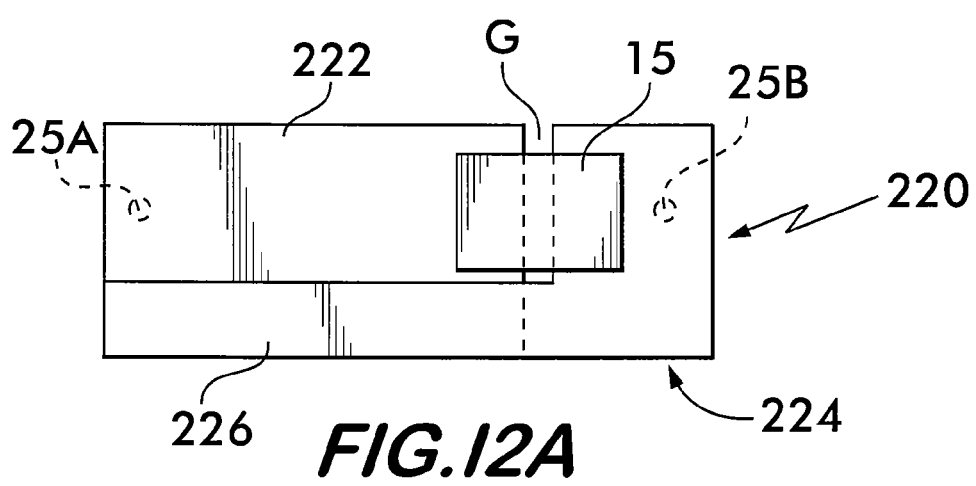
FIG. 12A is a plan view of only the integrated parallel chip-capacitor strap of FIG. 12.
Figure 13:
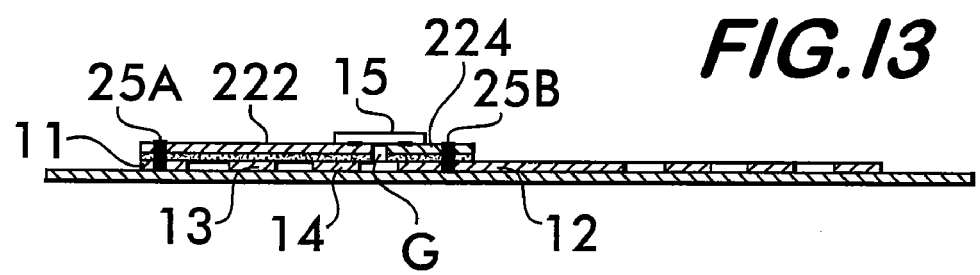
FIG. 13 is a cross-sectional view of the tag of FIG. 12 taken along line 13-13 of FIG. 12.
Figure 14:
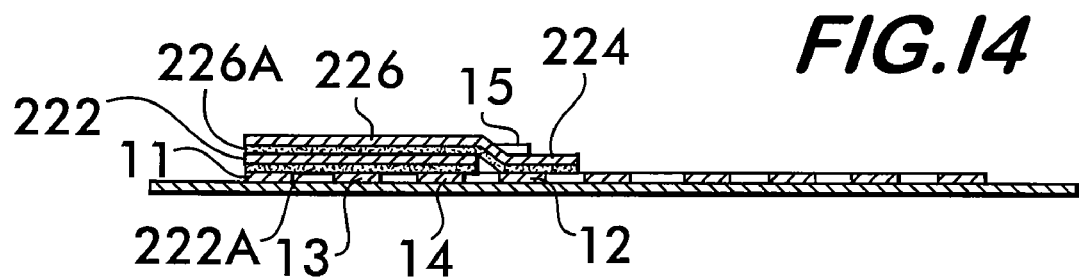
FIG. 14 is a cross-sectional view of the tag of FIG. 12 taken along line 14-14 of FIG. 12.
Figure 15:
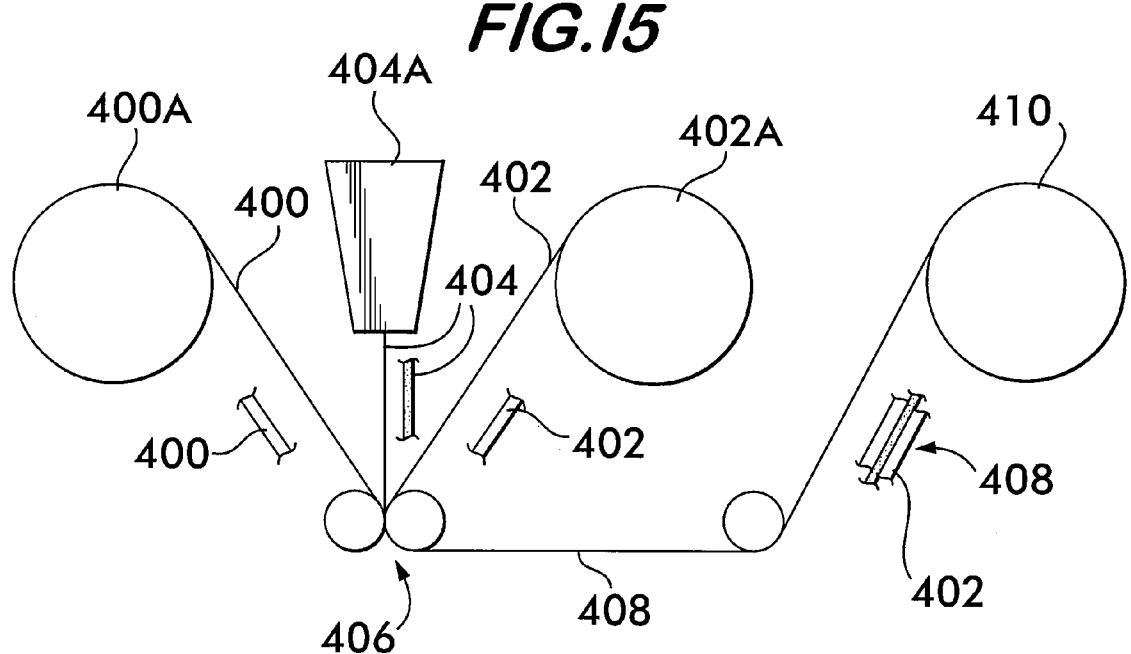
FIG. 15 depicts the creation process of a metal (e.g., aluminum) laminate in making capacitor straps.

FIGS. 12-14 depict an RFID tag 18' using a parallel resonant circuit (similar to the one shown in FIG. 9A) but with an integrated parallel chip-capacitor strap 220; thus, instead of using a separate capacitor strap 20 and a conventional chip strap 19, the integrated parallel chip-capacitor strap 220 is used. In particular, as shown most clearly in FIG. 12A, the integrated parallel chip-capacitor strap 220 is formed from basically three parts: a rectangular conductive flange 222, an "L-shaped" conductive flange 224 having a narrow section 226 that overlaps a portion of the rectangular conductive flange 222, and an IC 15. The IC 15 has respective electrical contacts (not shown) that are electrically coupled to the flange 222 and to the flange 224. A gap G separates the flanges 222 and 224 from electrically shorting out the contacts. A dielectric layer 226A is disposed between the flange 222 and the narrow section 226 which forms the capacitor. A dielectric layer 222A electrically insulates the rectangular conductive flange 222 from the turn tracks 11-14. The flange 222 is electrically coupled to the coil track 11 at connection point 25A as shown in FIGS. 12 and 13. The L-shaped conductive flange 224 is electrically coupled to the coil track 12 at connection point 25B as also shown in FIGS. 12 and 13. As described earlier with respect to varying the capacitance value of the capacitor straps 20 and 120, the capacitor strap 220 can be manufactured with varying amounts of overlap of the narrow section 226 with respect to the flange 222 to provide capacitor straps 220 with different capacitance values.

It should be noted that the use of the capacitor straps 20, 120 and 220 are not limited to coils. These straps could also be used in higher frequency applications where antennas, such as dipoles are used. Thus, by way of example only, a capacitor strap 20 or 120 or 220 could be positioned between the dipole elements of a dipole antenna to form a tag operating in the UHF or microwave frequency bands.

It should also be noted that although all of the capacitor straps 20, 120 and 220 are shown being electrically coupled on top of the coils 10/10A, this is by way of example only. These straps can also be electrically coupled below the coils 10/10A or antenna. If so, penetration of the substrate (not shown) which supports the coil or antenna would have to occur to permit the electrical connection.

The term "inlay" as used throughout this Specification means that the completed tag (e.g., EAS tag 16, RFID tags 17, or 18 or 18') may themselves either form a portion of a label or be coupled to a label for use on, or otherwise associated with, an item.

The capacitor straps 20, 120 and 220 can also include deactivation mechanisms that permit the security tag formed thereby to be deactivated by an external field when required such as including a predetermined breakdown voltage of the capacitor strap, or including a breakdown in a specific area of the capacitor strap, such as disclosed in U.S. Pat. No. 5,861, 809 (Eckstein, et al.); U.S. Pat. No. 6,232,878 (Rubin) and U.S. Pat. No. 6,025,780 (Bowers, et al.) and all of whose entire disclosures are incorporated by reference herein.

As mentioned earlier, FIGS. 15-18 depict the creation of a roll of capacitor straps using a printing/etching process.

For clarity, throughout FIGS. 15-18, cross-sections of portions of layers or laminates are shown at the different stages. It should be noted that these thicknesses are greatly exaggerated and do not depict the actual thickness of the various layers.

Figure 16:
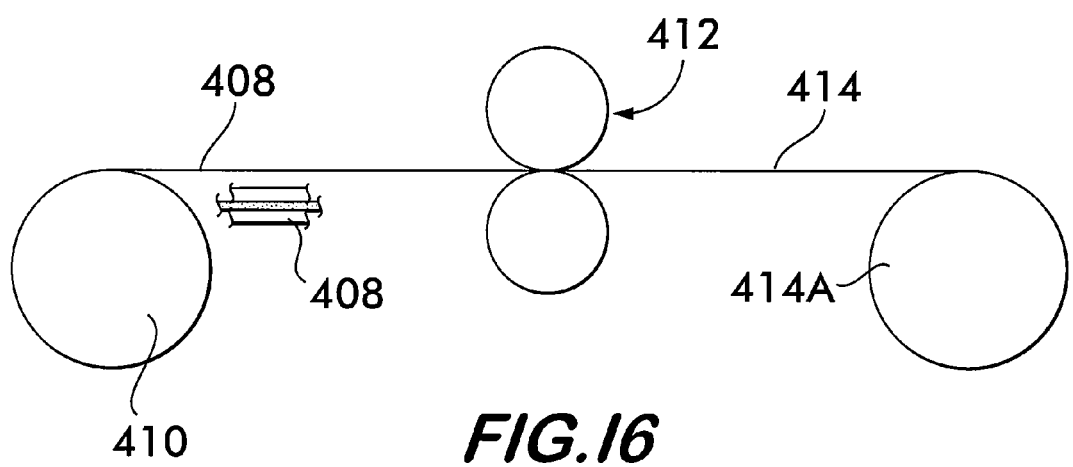
FIG. 16 depicts a printing photoresist image process on the metal laminate created in FIG. 15.
Figure 17:
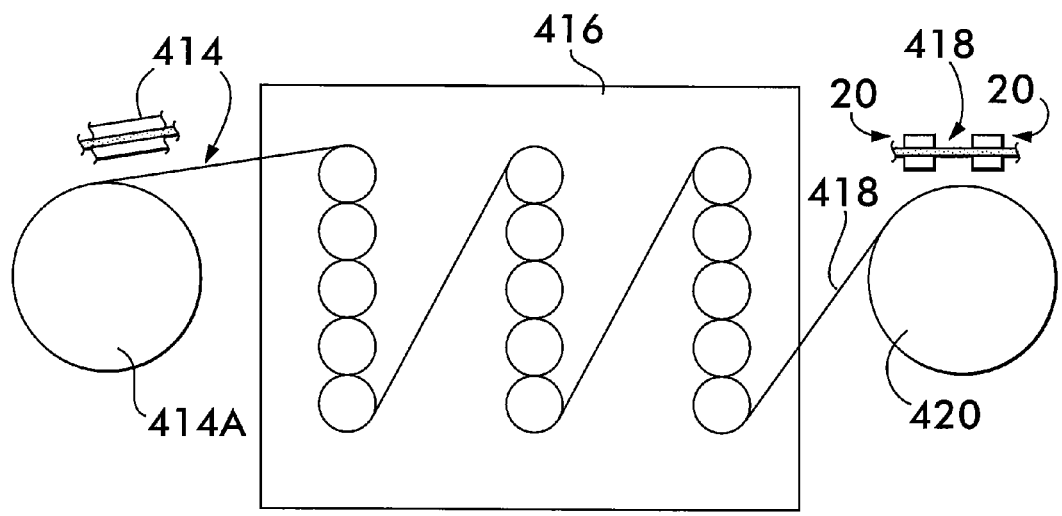
FIG. 17 depicts an etching process for creating the capacitor straps out of the metal laminate upon which the photoresist was applied in FIG. 16.
Figure 18:
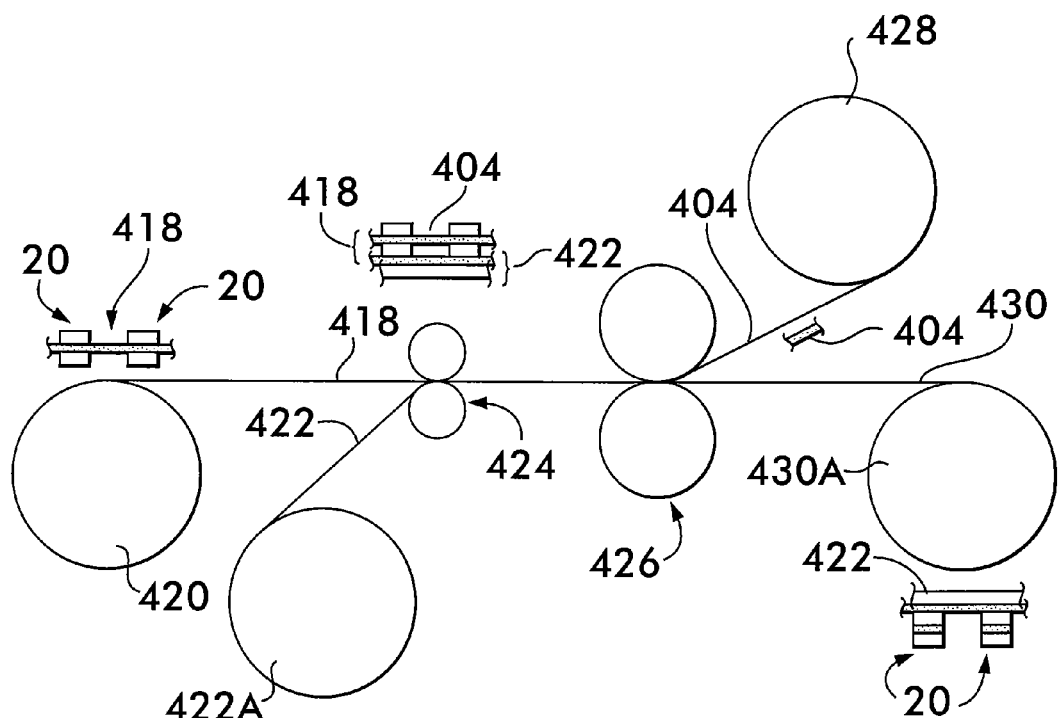
FIG. 18 depicts the application or a removable liner to the capacitor strap web and the removal of waste therefrom, resulting in a roll of capacitor straps ready for application to a coil or antenna.

In particular, a laminate 408 is formed from two layers of a metal (e.g., aluminum) 400 and 402 (from respective rolls 400A/402A) that are joined to a polyethylene (PET) extrusion 404 (a "hot" PET) from a PET extrusion stage 404A. Following the combining stage 406, the metal laminate 408 is wound on a take-up roll 410. Next, as shown in FIG. 16, the take-up roll 410 is fed to a printing process whereby photoresist is selectively applied, on both sides, at a printing station 412 and the "printed laminate" 414 is fed to a take-up roll 414A. As shown in FIG. 17, the printed laminate 414 is then fed to an etching process 416 whereby portions of the metal (e.g., aluminum) layers, on both sides of the laminate 414, are etched away, thereby leaving isolated portions of metal bands on both sides of the laminate, thereby forming a capacitor strap web 418. This capacitor strap web 418 is then fed to a take-up roll 420. The next stage (FIG. 18) in the process is to apply all of these capacitor straps to a liner with a releasable adhesive and then to physically separate each capacitor strap 20 from adjacent straps. In particular, a roll 422A of a liner 422 with a releasable adhesive is combined with the capacitor strap web 418 at station 424. Then, at a die cutting station 426, portions of the extrusion layer 404 in between the capacitor straps 20 are severed and removed to a waste take-up roll 428. The end result is a plurality of capacitor straps 20 (or 120 or 220) on a web 430 that are wound up on a roll 430A that are ready for application to coils or antennas.

Figure 19:
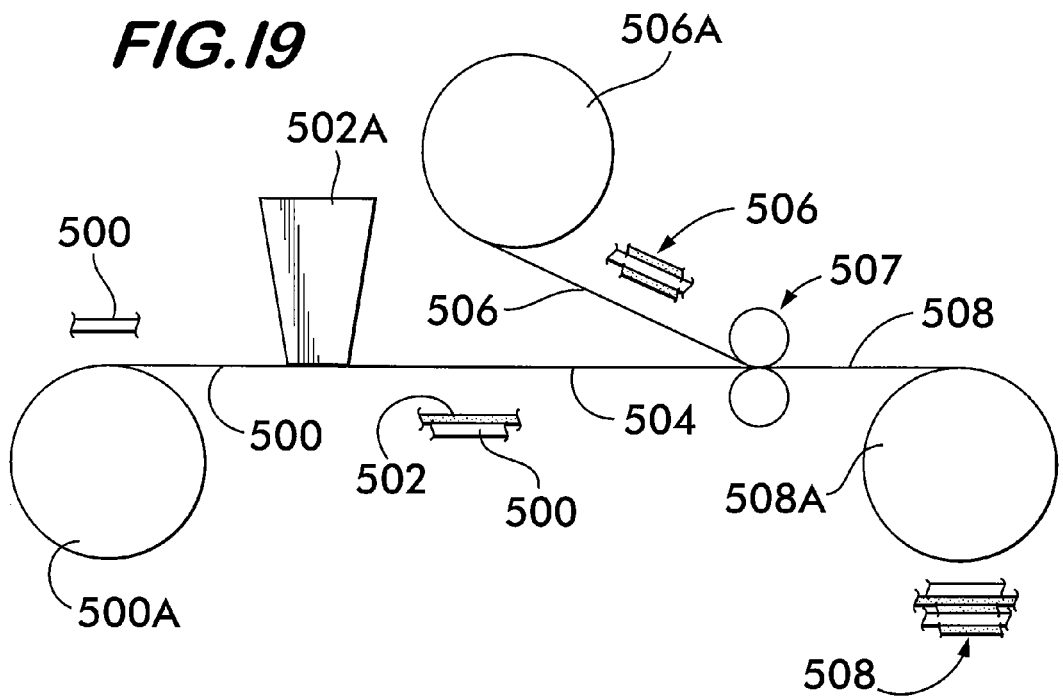
FIG. 19 depicts a portion of the "hybrid-style" process of forming capacitor straps and more particularly shows the creation of a metal (e.g., aluminum) laminate formed from a double-side heat seal coated metal (e.g., aluminum) laminate.
Figure 20:
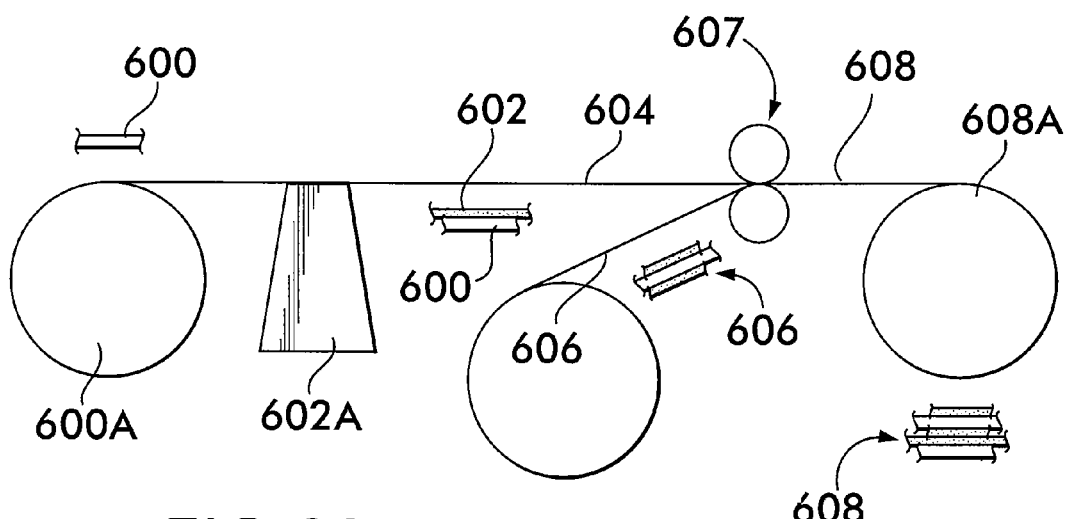
FIG. 20 depicts the creation of a second double-side heat seal coated metal (e.g., aluminum) laminate using the "hybrid-style" process.
Figure 21:
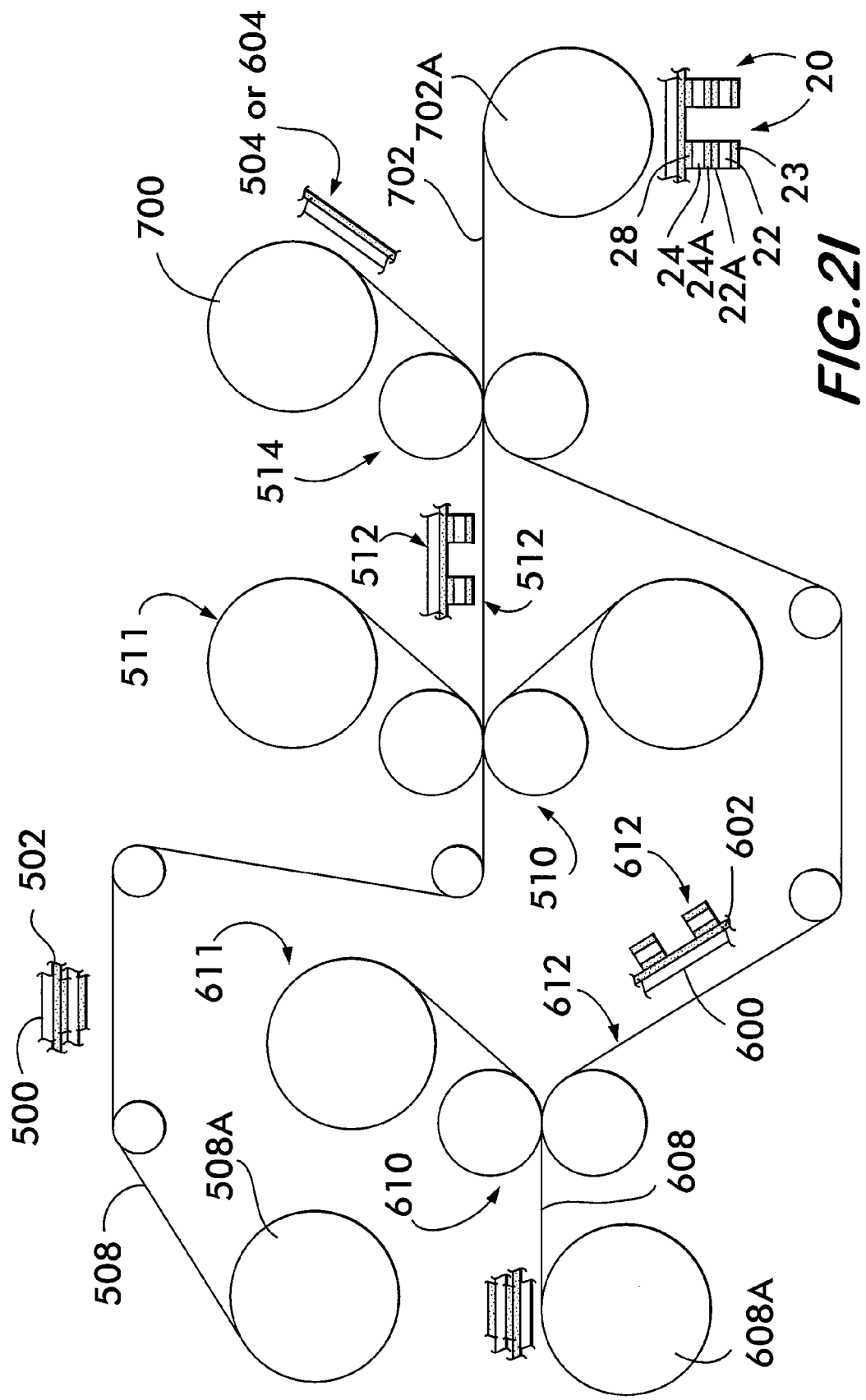
FIG. 21 depicts the combination of these two metal (e.g., aluminum) laminates shown in FIGS. 19-20, along with the application of a releasable liner, and waste removal, resulting in a roll of capacitor straps ready for application to a coil or antenna.

As also mentioned earlier, an alternative process for making capacitor straps uses the "hybrid-style" process. One of the advantages of this process is that the metal layers used in this process are heat seal coated. As a result, the capacitor "plates" of the capacitor straps are insulated from the beginning so there is no need to introduce a separate insulating layer 28A, as shown in FIG. 2B, when the capacitor strap may span several turns of a coil or antenna. FIGS. 19-21 depict the creation of a roll of capacitor straps using the "hybrid-style" process.

For clarity, throughout FIGS. 19-21, cross-sections of portions of layers or laminates are shown at the different stages. It should be noted that these thicknesses are greatly exaggerated and do not depict the actual thickness of the various layers.

In particular, as shown in FIG. 19, a liner 500 from a liner supply roll 500A is fed to an extruder 502A where an adhesive 502 is applied to the liner 500 to form a liner 504 with a releasable adhesive. From a supply roll 506A of double side heat seal coated metal (e.g., aluminum) 506, the heat seal coated metal 506 is combined, at combining station 507, with the liner 504 with the releasable adhesive to form a laminate 508 that forms a "set of plates" of the capacitor straps; a take-up roll 508A holds this laminate 508. A second similar laminate 608 is formed using a similar process. This second similar laminate 608 forms the "other set of plates" of the capacitor straps. Reference numbers 600-608A correspond directly to reference numbers 500-508A and are therefore not discussed any further. The take-up rolls 508A and 608A are then used in a combination process to form the capacitor straps, as shown in FIG. 21. In particular, the laminates 508 and 608 are die cut at respective die cutting stations 510 and 610 through the double side heat seal coated metal portions (506 and 606) and the waste removed onto respective waste take-up rolls 511/611 in order to form isolated bands 512/612 of the double heat seal coated metal (e.g., aluminum). As can be seen in FIG. 21, these isolated bands 512 and 612 are facing each other (e.g., bands 512 face downward and bands 612 face upward). In these orientations, the individual isolated bands 512 and 612 are registered and then stamped at stamping station 514 to form the capacitor straps. To permit the individual capacitor straps to be removed and applied to coils or antennas, one of the liners with the releasable adhesive (i.e., 504 or 604) needs to be removed onto a take-up roll 700. The end result is a plurality of capacitor straps 20 (or 120 or 220) on web 702 that are wound up on a roll 702A that are ready for application to coils or antennas. FIG. 21 also shows the capacitor strap 20 in cross section that corresponds to FIG. 2A.

While the invention has been described in detail and with reference to specific examples thereof, it will be apparent to one skilled in the art that various changes and modifications can be made therein without departing from the spirit and scope thereof.

What is claimed is:

1. A strap component for electrically bridging at least two respective portions of an antenna or coil component of an EAS or RFID tag or inlay, said strap component comprising:
   a first electrically conductive planar element;
   a second planar electrically conductive element; and
   a planar dielectric layer disposed between at least portions of said first and second electrically conductive planar elements, and wherein said first electrically conductive planar element, said planar dielectric layer and said second planar electrically conductive element are formed into a strap structure, whereupon said strap structure exhibits a desired capacitance, and wherein said strap structure is applied to the antenna or coil, said first electrically conductive element including a first portion arranged to be secured in electrical continuity with one of the at least two respective portions of the antenna or coil, said second electrically conductive element including a first portion arranged to be secured in electrical continuity with another of the at least two respective portions of the antenna or coil.

2. The strap component of claim 1 wherein the antenna or coil includes a pair of ends and wherein said first portion of said first electrically conductive element is arranged to be secured at any desired location on the antenna or coil at or between the ends of the antenna or coil and said first portion of said second electrically conductive element is arranged to be secured at any desired location on the antenna or coil at or between the ends of the antenna or coil, whereupon the operating frequency of the EAS or RFID tag or inlay is established.

3. The strap component of claim 1 wherein said strap component is stacked below the antenna or coil.

4. The strap component of claim 1 additionally comprising an integrated circuit chip mounted therein and in electrical continuity therewith, whereupon when said strap component is connected to said antenna or coil, a RFID tag or inlay results.

5. The strap component of claim 4 wherein said integrated circuit is electrically coupled to one of said first or second electrically conductive elements such that said integrated circuit is in series with said desired capacitance.

6. The strap component of claim 4 wherein said integrated circuit includes a first electrical contact and a second electrical contact and wherein said first electrical contact is electrically coupled to said first electrically conductive element and said second electrical contact is electrically coupled to said second electrically conductive element such that said integrated circuit is in parallel with said desired capacitance.

7. The strap component of claim 6 wherein one of said electrically conductive elements is "L-shaped" and wherein a first portion of said one of said electrically conductive elements overlaps a second portion of said other one of said electrically conductive elements.

8. The strap component of claim 1 wherein said first and second electrically conductive planar elements are juxtaposed with respect to each other so that at least a portion of both of said electrically conductive planar elements overlap and with their respective dielectric material coating layers at the location of such an overlap confronting each other to establish a desired capacitance for said strap component.

9. The strap component of claim 8 wherein the antenna or coil includes a pair of ends and wherein said first portion of said first electrically conductive element is arranged to be secured at any desired location on the antenna or coil at or between the ends of the antenna or coil and said first portion of said second electrically conductive element is arranged to be secured at any desired location on the antenna or coil at or between the ends of the antenna or coil, whereupon the operating frequency of the EAS or RFID tag or inlay is established.

10. The strap component of claim 1 wherein said first portion of said first electrically conductive planar element is arranged to be secured in electrical continuity with a selected portion of said antenna or coil component by means of a weld and wherein said first portion of said second electrically conductive planar element is arranged to be secured in electrical continuity with another selected portion of said antenna or coil component by means of a weld.

11. The strap component of claim 1 wherein said first portion of said first electrically conductive planar element is arranged to be secured in electrical continuity with a selected portion of said antenna or coil component by means of a crimp and wherein said first portion of said second electrically conductive planar element is arranged to be secured in electrical continuity with another selected portion of said antenna or coil component by means of a crimp.

12. An EAS or RFID tag or inlay comprising an antenna or coil component and a strap component bridging at least two respective portions of said antenna or coil component, said strap component comprising a first electrically conductive planar element, a second electrically conductive planar element and a planar dielectric layer disposed between at least portions of said first and second electrically conductive planar elements, and wherein said first electrically conductive planar element, said planar dielectric layer and said second planar electrically conductive element are formed into a strap structure, whereupon said strap structure exhibits a desired capacitance, and wherein said strap structure is applied to the antenna or coil, said first electrically conductive element including a first portion secured in electrical continuity with one of said at least two respective portions of said antenna or coil, said second electrically conductive element including a first portion secured in electrical continuity with another of said at least two respective portions of said antenna or coil.

13. The EAS or RFID tag or inlay of claim 12 wherein said antenna or coil includes a pair of ends and wherein said first portion of said first electrically conductive element is secured at any desired location on said antenna or coil at or between the ends of the antenna or coil and said first portion of said second electrically conductive element is secured at any desired location on the antenna or coil at or between the ends of said antenna or coil, whereupon the operating frequency of the EAS or RFID tag or inlay is established.

14. The EAS or RFID tag or inlay of claim 13 wherein said securement of said strap component to said antenna or coil is by means of welding.

15. The EAS or RFID tag or inlay of claim 12 wherein said strap component is stacked below said antenna or coil.

16. The EAS or RFID tag or inlay of claim 12, wherein said tag or inlay is an RFID tag and wherein said strap includes an integrated circuit mounted thereon.

17. A thin, generally planar, flexible, strap component for electrically bridging at least two respective portions of an antenna or coil component of an EAS or RFID tag or inlay, said strap component exhibiting a desired capacitance and comprising a first electrically conductive planar element and a second electrically conductive planar element, and a planar dielectric layer disposed between at least portions of said first and second electrically conductive planar elements, and wherein said first electrically conductive planar element, said planar dielectric layer and said second planar electrically conductive element are formed into a strap structure and wherein said strap structure is applied to the antenna or coil, said first electrically conductive element including a first portion arranged to be secured in electrical continuity with one of the at least two respective portions of the antenna or coil, said second electrically conductive element including a first portion arranged to be secured in electrical continuity with another of the at least two respective portions of the antenna or coil, to result in the formation of the EAS or RFID tag or inlay.

18. The strap component of claim 17 wherein the antenna or coil includes a pair of ends and wherein said first portion of said first electrically conductive element is arranged to be secured at any desired location on the antenna or coil at or between the ends of the antenna or coil and said first portion of said second electrically conductive element is arranged to be secured at any desired location on the antenna or coil at or between the ends of the antenna or coil, whereupon the operating frequency of the EAS or RFID tag or inlay is established.

19. The strap component of claim 17 wherein said strap component is stacked below the antenna or coil.

20. The strap component of claim 17 additionally comprising an integrated circuit chip mounted therein and in electrical continuity therewith, whereupon when said strap component is connected to said antenna or coil, a RFID tag or inlay results.

21. A method of making an EAS or RFID tag or inlay comprising:
   (a) providing a thin, generally planar antenna or coil component;
   (b) forming a thin, generally planar, strap component independent of said thin generally planar antenna or coil component and comprising a first electrically conductive planar element, a second electrically conductive planar element and a planar dielectric layer disposed between at least portions of said first and second electrically conductive elements, whereupon said strap component exhibits a desired capacitance; and
   (c) applying said strap component to said thin, generally planar antenna or coil component to bridge at least two respective portions of said antenna or coil component, whereupon a first portion of said first electrically conductive element is secured in electrical continuity with one of said at least two respective portions of said antenna or coil and a first portion of said second electrically conductive element is secured in electrical continuity with another of said at least two respective portions of said antenna or coil.

22. The method of claim 21 wherein said antenna or coil includes a pair of ends and wherein said first portion of said first electrically conductive element is secured at any desired location on said antenna or coil at or between the ends of the antenna or coil and said first portion of said second electrically conductive element is secured at any desired location on the antenna or coil at or between the ends of said antenna or coil, whereupon the operating frequency of the EAS or RFID tag or inlay is established.

23. The method of claim 21 wherein said first portion of said first electrically conductive element is welded to one of said at least two respective portions of said antenna or coil, and said first portion of said second electrically conductive element is welded to said other of said at least two respective portions of said antenna or coil.

24. The method of claim 21 wherein said strap component is stacked below said antenna or coil.

25. The method of claim 21 additionally comprising providing an integrated circuit chip mounted on said strap component and in electrical continuity therewith, whereupon when said strap component is connected to said antenna or coil a RFID tag or inlay results.

26. The method of claim 21 wherein said step of providing a thin, generally planar strap component comprises:
   (a) securing a metal layer on both sides of a polyethylene extrusion to form a laminate;
   (b) selectively applying a photoresist on both metal layers;
   (c) applying said laminate through an etching process to form a plurality of capacitor straps; and
   (d) applying a liner and a removable adhesive to one said of said laminate.

27. The method of claim 21 wherein said step of providing a thin, generally planar strap component comprises:
   (a) applying a double heat seal coated metal layer to a first liner using a removable adhesive and applying a second double heat seal coated metal layer to a second layer to form first and second metal laminates;
   (b) cutting portions of said double heat seal coated metal layer on said first and second liners to form a respective plurality of capacitor plates on said first and second liners;
   (c) positioning said respective plurality of capacitor plates to face each other;
   (d) registering each one of said plurality of capacitor plates on said first liner with a corresponding one of said plurality of capacitor plates on said second liner and combining them to form a plurality of capacitor straps; and
   (e) removing either one of said first or second liners.

28. The method of claim 27 wherein said metal layer is aluminum.

* * * * *